(12) United States Patent
Jia et al.

(10) Patent No.: US 11,262,631 B2
(45) Date of Patent: Mar. 1, 2022

(54) ARRAY SUBSTRATE AND METHOD FOR MANUFACTURING THE SAME, DISPLAY PANEL, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yihe Jia, Beijing (CN); Xiangqian Ding, Beijing (CN); Xiaoxiang Zhang, Beijing (CN); Hao Han, Beijing (CN); Lianjie Yang, Beijing (CN); Yongzhi Song, Beijing (CN); Yan Pang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 11 days.

(21) Appl. No.: 16/825,084

(22) Filed: Mar. 20, 2020

(65) Prior Publication Data

US 2021/0165293 A1 Jun. 3, 2021

(30) Foreign Application Priority Data

Nov. 29, 2019 (CN) .......................... 201911203965.X

(51) Int. Cl.
*G02F 1/1362* (2006.01)

(52) U.S. Cl.
CPC .. *G02F 1/136286* (2013.01); *G02F 1/136209* (2013.01); *G02F 1/13625* (2021.01); *G02F 1/136222* (2021.01)

(58) Field of Classification Search
None
See application file for complete search history.

(56) References Cited

U.S. PATENT DOCUMENTS

| 7,554,630 B2 | 6/2009 | Kwon et al. |
| 9,983,332 B2 | 5/2018 | Wang et al. |

(Continued)

FOREIGN PATENT DOCUMENTS

| CN | 1532606 A | 9/2004 |
| CN | 1677206 A | 10/2005 |

(Continued)

OTHER PUBLICATIONS

First Office Action, including Search Report, for Chinese Patent Application No. 201911203965.X, dated Nov. 18, 2021, 15 pages.

*Primary Examiner* — Richard H Kim
(74) *Attorney, Agent, or Firm* — Westman, Champlin & Koehler, P.A.

(57) ABSTRACT

The preset disclosure provides an array substrate and a method for manufacturing the same, a display panel and a display device. The array substrate includes: a base substrate; data lines and pixel electrodes located on the base substrate, and a light shielding structure located on a side of the data lines close to the base substrate, orthographic projections of the gaps on the base substrate are located within an orthographic projection of the light shielding structure on the base substrate, and the light shielding structure includes a metal layer and a first transparent layer located on a side of the metal layer away from the base substrate.

11 Claims, 2 Drawing Sheets

(56) References Cited

U.S. PATENT DOCUMENTS

| | | |
|---|---|---|
| 10,103,269 B2 | 10/2018 | Lee et al. |
| 10,989,842 B2 | 4/2021 | Wang et al. |
| 2005/0219436 A1* | 10/2005 | Kwon ............... G02F 1/136209 |
| | | 349/44 |
| 2008/0049176 A1* | 2/2008 | Kim .................. G02F 1/133555 |
| | | 349/114 |
| 2017/0139081 A1* | 5/2017 | Wang ................ G02F 1/133526 |
| 2018/0033893 A1 | 2/2018 | Lee et al. |
| 2018/0149935 A1* | 5/2018 | Lee ................... G02F 1/136209 |
| 2018/0172881 A1* | 6/2018 | Zhang .................... G02B 5/205 |
| 2018/0239061 A1 | 8/2018 | Wang et al. |

FOREIGN PATENT DOCUMENTS

| | | |
|---|---|---|
| CN | 104865619 A | 8/2015 |
| CN | 107407846 A | 11/2017 |

\* cited by examiner

ARRAY SUBSTRATE AND METHOD FOR MANUFACTURING THE SAME, DISPLAY PANEL, AND DISPLAY DEVICE

CROSS-REFERENCE TO RELATED APPLICATION

The present application claims the priority of Chinese Patent Application No. 201911203965.X filed on Nov. 29, 2019, the contents of which are incorporated herein in their entirety by reference.

TECHNICAL FIELD

The present disclosure relates to the field of display technology, and in particular to an array substrate and a method for manufacturing the same, a display panel, and a display device.

BACKGROUND

In a liquid crystal display panel of the related art, the signals transmitted by the data lines will affect the pixel electrodes, resulting in an abnormal electric field between the data lines and the pixel electrodes. In an area between the data lines and the pixel electrodes, the liquid crystal appears disordered and causes light leakage. In order to block light leakage, a wider black matrix needs to be provided to block light leakage, which will affect the aperture ratio of the liquid crystal display panel.

SUMMARY

In an aspect, an embodiment of the present disclosure provides an array substrate which includes: a base substrate; data lines and pixel electrodes arranged on the base substrate, and a light shielding structure disposed on a side of the data lines close to the base substrate, orthographic projections of the gaps on the base substrate are located within an orthographic projection of the light shielding structure on the base substrate, and the light shielding structure includes a metal layer and a first transparent layer located on a side of the metal layer away from the base substrate.

Optionally, the light shielding structure and a gate metal layer of the array substrate are formed in a same layer with a same material.

Optionally, the light shielding structure further includes: a second transparent layer located on a side of the metal layer close to the base substrate.

Optionally, the metal layer is made of copper; the first transparent layer and/or the second transparent layer are made of molybdenum oxide.

Optionally, a film thickness of the first transparent layer satisfies a formula as follows:

$$2*n1*h1=(2k-1)*(\lambda 1/2);$$

wherein n1 is a refractive index of the first transparent layer, h1 is the film thickness of the first transparent layer, k is a positive integer, λ1 is a wave length of light incident from a side of the first transparent layer away from the base substrate.

Optionally, n1 ranges from 2.2 to 2.3, and the film thickness of the first transparent layer ranges from 50 nm to 60 nm.

Optionally, a film thickness of the second transparent layer satisfies a formula as follows:

$$2*n2*h2=(2k-1)*(\lambda 2/2);$$

wherein n2 is a refractive index of the second transparent layer, h2 is the film thickness of the second transparent layer, k is a positive integer, λ2 is a wave length of light incident from a side of the second transparent layer away from the metal layer.

Optionally, n2 ranges from 2.2 to 2.3, and the film thickness of the second transparent layer ranges from 50 nm to 60 nm.

An embodiment of the present disclosure further provides a display device which includes the above array substrate and a color-filter substrate arranged opposite to the array substrate, the array substrate being located on a light outgoing side of the color-filter substrate.

An embodiment of the present disclosure further provides a method for manufacturing an array substrate which includes:

providing a base substrate;

forming data lines and pixel electrodes on the base substrate, wherein there are gaps between orthographic projections of the data lines on the base substrate and orthographic projections of outlines of the pixel electrodes on the base substrate; and the method for manufacturing an array substrate further includes:

forming a light shielding structure on a side of the date lines close to the base substrate, wherein orthographic projections of the gaps on the base substrate are located within an orthographic projection of the light shielding structure on the base substrate, and the light shielding structure includes a metal layer and a first transparent layer located on a side of the metal layer away from the base substrate.

Optionally, the forming the light shielding structure includes:

forming the light shielding structure and a gate metal layer of the array substrate through a single patterning process.

Optionally, the forming the light shielding structure further includes:

forming a second transparent layer on a side of the metal layer close to the base substrate.

Optionally, the method for manufacturing an array substrate includes:

forming, on the base substrate, a three-layer structure including a molybdenum oxide layer, a copper layer and a molybdenum oxide layer;

coating a photoresist on the three-layer structure, and exposing and developing the photoresist to form a photoresist pattern; and etching the three-layer structure by an etching solution by using the photoresist pattern as a mask, to form the light shielding structure and the gate metal layer of the array substrate.

Optionally, the forming the molybdenum oxide layer on the base substrate includes:

bombarding a molybdenum oxide target with a plasma to form the molybdenum oxide layer on the base substrate, wherein a gas flow rate of a sputtering gas forming the plasma ranges from 600 to 800 sccm, a deposition pressure ranges from 0.25 to 0.35 pa, a sputtering power ranges from 7.5 to 8.5 kw, and a film formation rate of the molybdenum oxide layer ranges from 1.3 to 1.4 nm/s.

Figure 1:
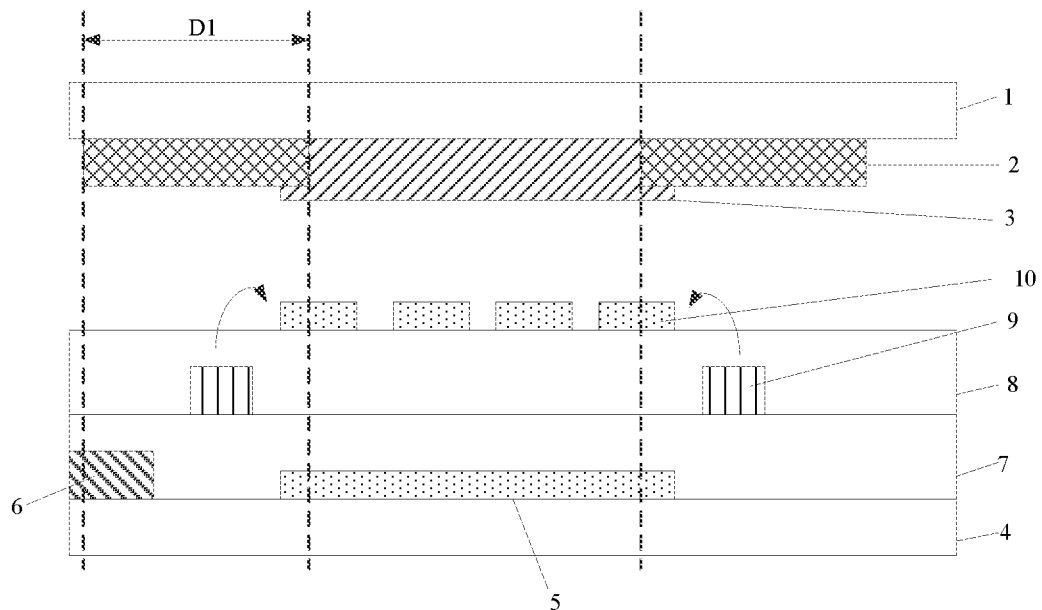
FIG. 1 is a schematic diagram of a liquid crystal display panel in the related art.

REFERENCE NUMERALS 1, 4 base substrate
2 black matrix
3 color-filtering unit
5 common electrode
6 gate line
7 gate insulation layer
8 passivation layer
9 data line
10 pixel electrode
11 light shielding structure
62 metal layer
61 first transparent layer
63 second transparent layer

DETAILED DESCRIPTION

In order to make the technical problems, technical solutions, and advantages of the embodiments of the present disclosure clearer, detailed descriptions will be made below with reference to the accompanying drawings and specific embodiments.

In a narrow-bezel display product of the related art, the array substrate is disposed on the display side, and the color-filter substrate is disposed on the non-display side. As shown in FIG. 1, the array substrate includes a base substrate 4, a common electrode 5 and gate lines 6 located on the base substrate 4, a gate insulation layer 7 covering the common electrode 5 and the gate lines 6, data lines 9 located on the gate insulation layer 7, a passivation layer 8 covering the data lines 9, and pixel electrodes 10 located on the passivation layer 8; the color-filter substrate includes a base substrate 1, color-filtering units 3 and a black matrix 2 located on the base substrate 1. As shown in FIG. 1, when the display product is working, electrical signals transmitted on the data lines 9 may interfere with signals on the pixel electrodes 10. Thus, an abnormal electric field exists between the data lines 9 and the pixel electrodes 10, resulting in disorder in the liquid crystal which in turn causes light leakage. Thus, it is necessary to provide a wider black matrix 2 on the color-filter substrate to block light leakage, which affects the aperture ratio of the liquid crystal display panel.

In order to solve the above problem, an embodiment of the present disclosure provides an array substrate and a method for manufacturing the same, a display panel, a display device which can improve the aperture ratio of the liquid crystal display panel.

Figure 2:
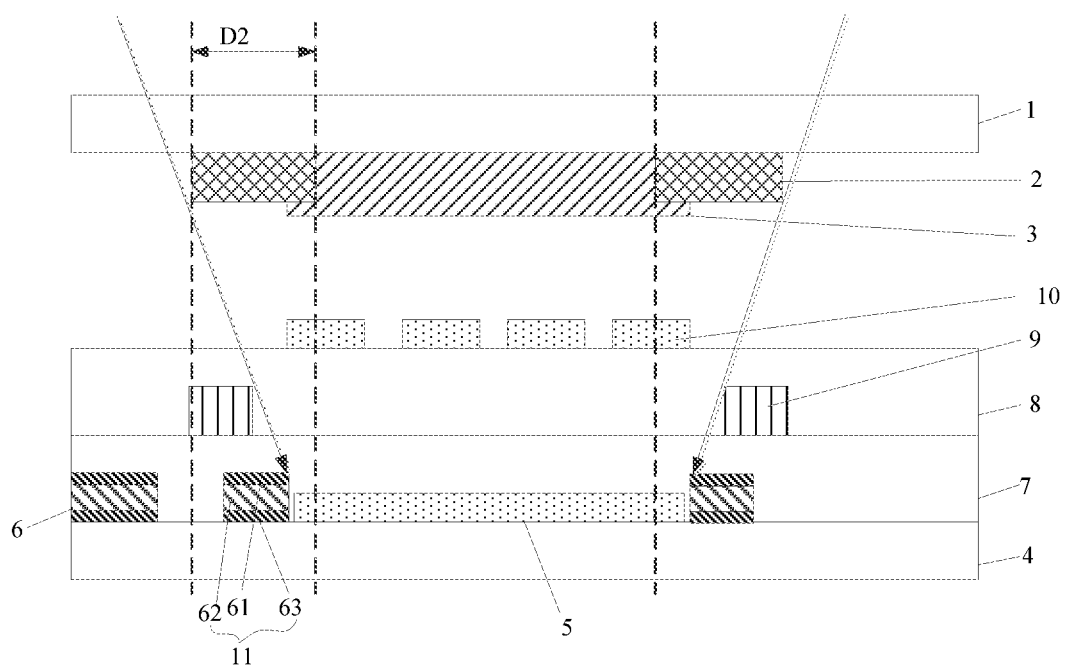
FIG. 2 is a schematic diagram of a liquid crystal display panel according to an embodiment of the present disclosure.
Figure 3:
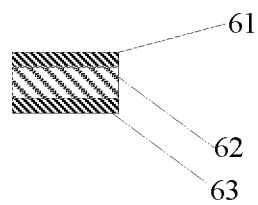
FIG. 3 is a structural diagram of a light shielding structure according to an embodiment of the present disclosure.

An embodiment of the present disclosure provides an array substrate which, as shown in FIGS. 2 and 3, includes: a base substrate 4; data lines 9 and pixel electrodes 10 located on the base substrate 4, wherein there are gaps between orthographic projections of the data lines 9 on the base substrate and orthographic projections of outlines of the pixel electrodes 10 on the base substrate 4. The array substrate further includes:

a light shielding structure 11 located on a side of the data lines 9 close to the base substrate 4, wherein orthographic projections of the gaps on the base substrate 4 are located within an orthographic projection of the light shielding structure 11 on the base substrate 4, and the light shielding structure 11 includes a metal layer 62 and a first transparent layer 61 located on a side of the metal layer 62 away from the base substrate 4.

Figure 4:
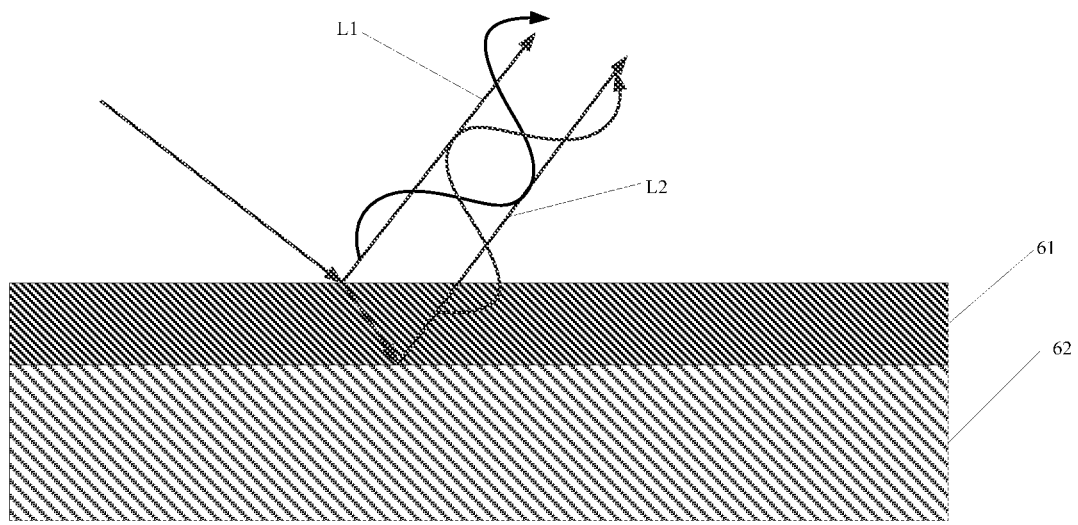
FIG. 4 is a schematic diagram of reducing light leakage according to an embodiment of the present disclosure.

In the embodiment, there are gaps between the orthographic projections of the data lines on the base substrate and the orthographic projections of the pixel electrodes on the base substrate, and the orthographic projections of the gaps on the base substrate are located within the orthographic projection of the light shielding structure on the base substrate. The light shield structure includes the metal layer and the first transparent layer 61 which is located on the side of the metal layer away from the base substrate 4. In this way, in a case that the signals transmitted by the data lines affect the pixel electrodes so that an abnormal electric field appears between the data lines and the pixel electrodes, as shown in FIG. 4, the backlight passing through the area between the data lines and the pixel electrodes irradiates to the surfaces of the first transparent layer 61 and the metal layer 62. The light L1 and L2 reflected respectively by the two surfaces have the same phase, so the light waves destructively interfere when they meet in space, which can eliminate the backlight passing through the area between the data lines and the pixel electrodes and avoid light leakage. In this way, there is no need to provide a wider black matrix to block light leakage, and the aperture ratio of the liquid crystal display panel can be improved.

The light shielding structure 11 and a gate metal layer (such as the gate lines 6) of the array substrate may be formed in a same layer with a same material. Thus, the light shielding structure 11 may be formed by the same manufacturing process while the gate lines 6 are being manufactured, and the light shielding structure 11 does not need to be manufactured by a special patterning process, which can simplify the manufacturing process of the array substrate and reduce the production cost of the array substrate.

In the case that the light shield structure includes the metal layer and the first transparent layer 61 that are laminated, the gate metal layer, such as the gate line 6, is also composed of the metal layer and the first transparent layer 61 that are laminated.

Since copper has good electrical conductivity, the metal layer 62 may be made of copper. Of course, the metal layer 62 is not limited to copper, and other metals or alloys with good electrical conductivity can also be used. For example, the metal layer 62 may also be made of an alloy of MoNb and Cu, or an alloy of Al, Mo, and Al; the first transparent layer 61 may be made of molybdenum oxide. Specifically, molybdenum oxide includes molybdenum dioxide and/or molybdenum trioxide, and molybdenum dioxide and molybdenum trioxide have high electrical conductivity. The first transparent layer 61 made of molybdenum dioxide and/or molybdenum trioxide has conductivity and is connected in parallel with the metal layer 62. It can also reduce the resistance of the gate metal layer, further improving the performance of the array substrate.

It should be noted that, in the case that the light shielding structure 11 is conductive, the light shielding structure 11 is insulated from other conductive patterns of the array substrate so as to avoid affecting the performance of the array substrate.

In addition, as shown in FIG. 1, the gate line 6 is located on the light outgoing side of the array substrate. After the ambient light is incident through the base substrate 4, it will irradiate on the gate line 6 and reflected by the gate line 6, so that the array substrate will still emit light in the black state, which affects the viewing experience. In this embodiment, if the light shielding structure 11 is provided on the array substrate, the ambient light incident through the base substrate 4 will also irradiate on the light shielding structure 11 and reflected by the light shielding structure 11, which will also affect the viewing experience.

In order to reduce the reflection of the array substrate to light, as shown in FIGS. 2 and 3, the light shielding structure 11 further includes: a second transparent layer 63 which is located on a side of the metal layer 62 close to the base substrate 4

Figure 5:
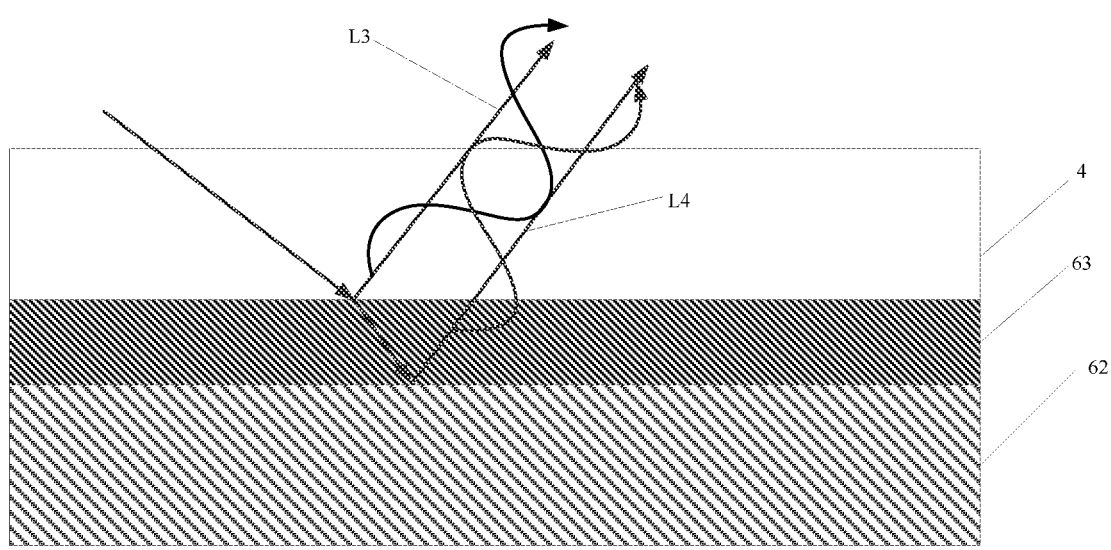
FIG. 5 is a schematic diagram of reducing reflection of ambient light according to an embodiment of the present disclosure.

As shown in FIG. 5, the ambient light incident through the base substrate 4 irradiates to the surfaces of the second transparent layer 63 and the metal layer 62. The light L3 and L4 reflected respectively by the two surfaces have the same phase, so the light waves destructively interfere when they meet in space, which can eliminate the ambient light incident through the base substrate 4 and reduce the reflection of the array substrate to the ambient light greatly.

The light shielding structure 11 and a gate metal layer (such as the gate lines 6) of the array substrate may be formed in a same layer with a same material. Since the two uses the same film structure, the light shielding structure 11 may be formed by the same manufacturing process while the gate lines 6 are being manufactured, and the light shielding structure 11 does not need to be manufactured by a special patterning process, which can simplify the manufacturing process of the array substrate and reduce the production cost of the array substrate.

In the case that the light shielding structure 11 includes the metal layer 62, the first transparent layer 61 and the second transparent layer 63 that are laminated, the gate metal layer (such as the gate lines 6) is also composed of the metal layer 62, the first transparent layer 61 and the second transparent layer 63 that are laminated.

Since copper has good electrical conductivity, the metal layer 62 may be made of copper. Of course, the metal layer 62 is not limited to copper, and other metals or alloys with good electrical conductivity can also be used. For example, the metal layer 62 may also be made of an alloy of MoNb and Cu, or an alloy of Al, Mo, and Al; the second transparent layer 63 and/or the first transparent layer 61 may be made of molybdenum oxide. Specifically, molybdenum oxide includes molybdenum dioxide and/or molybdenum trioxide, and molybdenum dioxide and molybdenum trioxide have high electrical conductivity. The second transparent layer 63 and the first transparent layer 61 are made of molybdenum dioxide and/or molybdenum trioxide, and are connected in parallel with the metal layer 62, which can also reduce the resistance of the gate metal layer, further improving the performance of the array substrate.

It should be noted that, in the case that the light shielding structure 11 is conductive, the light shielding structure 11 is insulated from other conductive patterns of the array substrate so as to avoid affecting the performance of the array substrate.

The thickness of the first transparent layer 61 is set such that the optical path difference of the reflected light on the upper and lower surfaces of the first transparent layer 61 is an odd multiple of a half wavelength of the reflected light, and the thickness of the first transparent layer 61 satisfies a formula as follows:

$$2*n1*h1=(2k-1)*(\lambda 1/2); \quad (1)$$

where n1 is a refractive index of the first transparent layer 61, h1 is the film thickness of the first transparent layer 61, k is a positive integer, λ1 is a wave length of light incident from a side of the first transparent layer 61 away from the base substrate 4. A value of n1 may be 2.2 to 2.3.

In this way, after the backlight transmitted through the region between the data lines and the pixel electrodes irradiate to the surfaces of the first transparent layer 61 and the metal layer 62, the light reflected from the upper and lower surfaces of the first transparent layer 61 will interfere and be canceled, thereby the backlight transmitted through the region between the data lines and the pixel electrodes is absorbed. Specifically, the thickness of the first transparent layer 61 can be adjusted according to the wavelength of the incident light, as long as it can ensure that the optical path difference of the reflected light on the upper and lower surfaces of the first transparent layer 61 is an odd multiple of the half-wavelength of the reflected light. Since the wavelength of visible light is mostly around 550 nm, and most of the backlight transmitted through the region between the data lines and the pixel electrodes is nearly perpendicular to the first transparent layer 61, λ1 in the above formula (1) may be 550 nm, When λ1 is equal to 550 nm and k=1, the reflectivity of the array substrate to light with a wavelength of 450-600 nm can be reduced to less than 10%, which can greatly reduce the light leakage of the array substrate.

Specifically, the thickness of the first transparent layer 61 is 50 nm to 60 nm.

Similarly, the thickness of the second transparent layer 63 is set such that the optical path difference of the reflected light on the upper and lower surfaces of the second transparent layer 63 is an odd multiple of a half wavelength of the reflected light, and the thickness of the second transparent layer 63 satisfies a formula as follows:

$$2*n2*h2=(2k-1)*(\lambda 2/2); \quad (2)$$

where n2 is a refractive index of the second transparent layer 63, h2 is the film thickness of the second transparent layer 63, k is a positive integer, λ2 is a wave length of light incident from a side of the second transparent layer 63 away from the metal layer. A value of n2 may be 2.2 to 2.3.

In this way, after the ambient light irradiates to the surfaces of the second transparent layer 63 and the metal layer 62, the light reflected from the upper and lower surfaces of the second transparent layer 63 will interfere and be canceled, thereby achieving anti-reflection. Specifically, the thickness of the second transparent layer 63 can be adjusted according to the wavelength of the incident light, as long as it can ensure that the optical path difference of the reflected light on the upper and lower surfaces of the second transparent layer 63 is an odd multiple of the half-wavelength of the reflected light. Since the wavelength of visible light is mostly around 550 nm, and most of the light is nearly perpendicular to the second transparent layer 63, λ2 in the above formula (2) may be 550 nm, When λ2 is equal to 550 nm and k=1, the reflectivity of the array substrate to light with a wavelength of 450-600 nm can be reduced to less than 10%, which can greatly reduce the reflection of the array substrate to ambient light.

Specifically, the thickness of the second transparent layer 63 is 50 nm to 60 nm.

An embodiment of the present disclosure further provides a display device which includes, as shown in FIG. 2, the aforementioned array substrate and a color-filter substrate arranged opposite to the array substrate. The array substrate is located on a light outgoing side of the color-filter substrate. The array substrate includes a base substrate 4, a common electrode 5 located on the base substrate 4, a light shielding structure 11 and gate lines 6, a gate insulation layer 7 covering the common electrode 5, the light shielding structure 11 and the gate lines 6, data lines 9 located on the gate insulation layer 7, a passivation layer 8 covering the data lines 9, and pixel electrodes 10 located on the passivation layer 8; the color-filter substrate includes a base substrate 1, color-filtering units 3 and a black matrix 2 located on the base substrate 1.

In the embodiment, there are gaps between the orthographic projections of the data lines on the base substrate and the orthographic projections of outlines of the pixel electrodes on the base substrate, the orthographic projections of the gaps on the base substrate are located within the orthographic projection of the light shielding structure on the base substrate, and the light shielding structure includes the metal layer and the first transparent layer which is located on a side of the metal layer away from the base substrate. In this way, in a case that the signals transmitted by the data lines affect the pixel electrodes so that an abnormal electric field appears between the data lines and the pixel electrodes, the backlight passing through the area between the data lines and the pixel electrodes irradiates to the surfaces of the metal layer and the first transparent layer, and the light reflected respectively by the two surfaces have the same phase; so the light waves destructively interfere when they meet in space, which can eliminate the backlight passing through the area between the data lines and the pixel electrodes and avoid light leakage. In this way, there is no need to provide a wider black matrix on the color-filter substrate to block light leakage, and the aperture ratio of the display device can be improved.

The display device includes, but is not limited to components such as a radio frequency unit, a network module, an audio output unit, an input unit, a sensor, a display unit, a user input unit, an interface unit, a storage, a processor, and a power supply. Those skilled in the art will understand that the structure of the above display device does not constitute a limitation on the display device, and the display device may include more or fewer components, or some components may be combined, or different components may be arranged. In the embodiment of the present disclosure, the display device includes, but is not limited to, a display, a mobile phone, a tablet, a television, a wearable electronic device, a navigation display device, and the like.

The display device may be any product or component having a display function, such as a television, a monitor, a digital photo frame, a mobile phone, a tablet, and the like. The display device further includes a flexible circuit board, a printed circuit board, and a back plate.

An embodiment of the present disclosure further provides a method for manufacturing an array substrate which includes:

providing a base substrate;

forming data lines and pixel electrodes on the base substrate, wherein there are gaps between orthographic projections of the data lines on the base substrate and orthographic projections of outlines of the pixel electrodes on the base substrate, the method for manufacturing an array substrate further includes:

forming a light shielding structure on a side of the date lines close to the base substrate, wherein orthographic projections of the gaps on the base substrate are located within an orthographic projection of the light shielding structure on the base substrate, and the light shielding structure includes a metal layer and a second transparent layer located on a side of the metal layer close to the base substrate.

In the embodiment, there are gaps between the orthographic projections of the data lines on the base substrate and the orthographic projections of outlines of the pixel electrodes on the base substrate, the orthographic projections of the gaps on the base substrate are located within the orthographic projection of the light shielding structure on the base substrate, and the light shielding structure includes the metal layer and the second transparent layer which is located on a side of the metal layer close to the base substrate. In this way, in a case that the signals transmitted by the data lines affect the pixel electrodes so that an abnormal electric field appears between the data lines and the pixel electrodes, the backlight passing through the area between the data lines and the pixel electrodes irradiates to the surfaces of the metal layer and the second transparent layer, and the light reflected respectively by the two surfaces have the same phase; so the light waves destructively interfere when they meet in space, which can eliminate the backlight passing through the area between the data lines and the pixel electrodes and avoid light leakage. In this way, there is no need to provide a wider black matrix to block light leakage, and the aperture ratio of the display device can be improved.

Optionally, the forming the light shielding structure includes:

forming the light shielding structure and a gate metal layer of the array substrate through a single patterning process.

In this way, while the gate metal layer is being manufactured, the light shielding structure may be formed by the same manufacturing process, and the light shielding structure does not need to be manufactured by a special patterning process, which can simplify the manufacturing process of the array substrate and reduce the production cost of the array substrate.

Optionally, the forming the light shielding structure further includes:

forming a first transparent layer on a side of the metal layer away from the base substrate.

After the ambient light incident through the substrate irradiates to the surfaces of the metal layer and the first transparent layer, the light reflected respectively by the two surfaces have the same phase; so the light waves destructively interfere when they meet in space, which can eliminate the ambient light incident through the substrate, and can greatly reduce the reflectivity of the array substrate to the ambient light.

In a specific embodiment, the method for manufacturing an array substrate includes the following steps:

Step 1, providing a base substrate 4, and forming a pattern of a common electrode 4 on the base substrate 4;

wherein the base substrate 4 may be a glass substrate or a quartz substrate. Specifically, a transparent conductive layer having a thickness of about 300 to 1500 Å is deposited on the base substrate 4 by sputtering or thermal evaporation. The transparent conductive layer may be made of ITO, IZO, or other transparent metal oxide. A layer of photoresist is coated on the transparent conductive layer, and the photoresist is exposed by using a mask, so that the photoresist forms a photoresist-unreserved area and a photoresist-reserved area, wherein the photoresist-reserved area corresponds to an area in which the pattern of the common electrode 5 is located, and the photoresist-unreserved area corresponds to an area other than the above pattern; after a development process, the photoresist in the photoresist-unreserved area is completely removed, and the thickness of the photoresist in the photoresist-reserved area remains unchanged; the film of the transparent conductive layer in the photoresist-unreserved area is completely etched away by an etching process, and the remaining photoresist is stripped to form the pattern of the common electrode 5.

Step 2, forming a three-layer structure including a molybdenum oxide layer, a copper layer and a molybdenum oxide layer, on the base substrate 4 after step 1;

the molybdenum oxide layer may be formed using a Physical Vapor Deposition (PVD) device. Specifically, in a vacuum environment, under the combined effect of voltage and magnetic field, the molybdenum oxide target is bombarded with ionized inert gas ions such as Ar particles, causing the molybdenum oxide target to be ejected and deposited in the form of ions, atoms or molecules on the substrate, to form a molybdenum oxide layer; the gas flow rate of the sputtering gas may be 600 to 800 sccm, the deposition pressure may be 0.25 to 0.35 pa, the sputtering power may be 7.5 to 8.5 kw, and the film formation rate may be 13 to 14 Å/s, which can ensure the uniformity of the deposited film;

a photoresist is coated on the three-layer structure, and a photoresist pattern is formed after the photoresist is exposed and developed. Using the photoresist pattern as a mask, the three-layer structure is etched with an etching solution so as to form the light shielding structure 11 and the gate metal layer of the array substrate, wherein the pattern of the gate metal layer includes the gate lines 6. As shown in FIG. 3, the formed light shielding structure 11 includes a metal layer 62, a first transparent layer 61, and a second transparent layer 63 that are laminated. Since copper has good conductivity, the metal layer 62 may be made of copper. Of course, the material of the metal layer 62 is not limited to copper, and other metals or alloys with good electrical conductivity may also be used. For example, the metal layer 62 may also be made of an alloy of MoNb and Cu, or an alloy of Al, Mo, and Al.

Step 3, forming a gate insulation layer 7 on the base substrate 4 after step 2;

specifically, the gate insulation layer 7 having a thickness of 500 to 5000 Å may be deposited on the substrate 4 after step 2 by using a plasma-enhanced chemical vapor deposition (PECVD) method. The material of the gate insulating layer 7 may be selected from oxide, nitride, or oxynitride, the corresponding reactive gases are $SiH_4$, $NH_3$, $N_2$, or $SiH_2Cl_2$, $NH_3$, $N_2$.

Step 4, forming a pattern of a source-drain metal layer on the base substrate after step 3;

specifically, a source-drain metal layer having a thickness of 2000 to 4000 Å may be deposited on the substrate 4 after step 3 by using magnetron sputtering, thermal evaporation, or other film forming methods. The source-drain metal layer may be made of a metal such as Cu, Al, Ag, Mo, Cr, Nd, Ni, Mn, Ti, Ta, W and the like or an alloy of these metals. The source-drain metal layer may have a single-layer structure, or may be a multi-layer structure, such as Cu\Mo, Ti\Cu\Ti, Mo\Al\Mo, and the like. A layer of photoresist is coated on the source-drain metal layer, and the photoresist is exposed by using a mask, so that the photoresist forms a photoresist-unreserved area and a photoresist-reserved area, wherein the photoresist-reserved area corresponding to an area in which the pattern of the source-drain metal layer is located, the photoresist-unreserved area corresponds to an area other than the above pattern; after a development process, the photoresist in the photoresist-unreserved area is completely removed, and the thickness of the photoresist in the photoresist-reserved area remains unchanged; the source-drain metal layer in the photoresist-unreserved area is completely etched by an etching process, and the remaining photoresist is stripped to form the pattern of the source-drain metal layer, which includes the data lines 9.

Step 5, forming a passivation layer 8;

specifically, a passivation layer 8 having a thickness of 2000 to 1000 Å may be deposited on the substrate 4 after step 4 by using magnetron sputtering, thermal evaporation, PECVD, or other film forming methods. The material of the passivation layer 8 may be selected from oxide, nitride, or oxynitride. Specifically, the passivation layer material may be $SiN_x$, $SiO_x$, or $Si(ON)_x$. The passivation layer may also be made of $Al_2O_3$. The passivation layer may have a single-layer structure, or a two-layer structure composed of silicon nitride and silicon oxide. The reactive gas corresponding to the oxide of silicon may be $SiH_4$, $N_2O$; and the reactive gas corresponding to the nitride or oxynitride may be $SiH_4$, $NH_3$, $N_2$, or $SiH_2Cl_2$, $NH_3$, $N_2$.

Step 6, forming a pattern of pixel electrodes 10 on the base substrate 4 after step 5;

specifically, a transparent conductive layer having a thickness of about 300 to 1500 Å is deposited on the base substrate 4 after step 5 by sputtering or thermal evaporation. The transparent conductive layer may be made of ITO, IZO, or other transparent metal oxide. A layer of photoresist is coated on the transparent conductive layer, and the photoresist is exposed by using a mask, so that the photoresist forms a photoresist-unreserved area and a photoresist-reserved area, wherein the photoresist-reserved area corresponds to an area in which the pattern of the pixel electrodes 10 are located, and the photoresist-unreserved area corresponds to an area other than the above pattern; after a development process, the photoresist in the photoresist-unreserved area is completely removed, and the thickness of the photoresist in the photoresist-reserved area remains unchanged; the film of the transparent conductive layer in the photoresist-unreserved area is completely etched away by an etching process, and the remaining photoresist is stripped to form the pattern of the pixel electrodes 10.

As shown in FIG. 4, after the backlight passing through the area between the data lines and the pixel electrodes irradiates to the surfaces of the metal layer 62 and the second transparent layer 63, light L1 and L2 reflected respectively by the two surfaces have the same phase, so the light waves destructively interfere when they meet in space, which can eliminate the backlight passing through the area between the data lines and the pixel electrodes and avoid light leakage. In this way, there is no need to provide a wider black matrix to block light leakage, and the aperture ratio of the liquid crystal display panel can be improved.

As shown in FIG. 5, after the ambient light incident through the base substrate 4 irradiates to the surfaces of the metal layer 62 and the second transparent layer 63, light L3 and L4 reflected respectively by the two surfaces have the same phase, so the light waves destructively interfere when they meet in space, which can eliminate the ambient light incident through the base substrate 4, and can greatly reduce the reflectivity of the array substrate to the ambient light.

It should be noted that the embodiments in this specification are described in a progressive manner, and the same or similar parts between the various embodiments may be referred to each other. Each embodiment focuses on the differences from other embodiments. In particular, for the method embodiment, since it is basically similar to the product embodiment, the description thereof is relatively simple, and the relevant parts may refer to the description of the product embodiment.

Unless otherwise defined, the technical or scientific terms used in the present disclosure shall have the ordinary meanings understood by those having ordinary skills in the field to which the present disclosure belongs. The terms "first", "second", and the like used in this disclosure do not indicate any order, quantity, or importance, but are only used to distinguish different components. Words such as "comprising" or "including" mean that the element or item appearing before the word covers the element or item appearing after the word and the equivalent thereof without excluding other elements or items. Words such as "connected" or "connected with each other" are not limited to physical or mechanical connections, but may include electrical connections, whether direct or indirect. The terms "up", "down", "left", "right", etc. are only used to indicate the relative position relationship. When the absolute position of the described object changes, the relative position relationship may also change accordingly.

It will be understood that when an element such as a layer, film, region, or substrate is referred to as being "on" or "under" another element, it can be "directly on" or "directly under" another element, or there may be intermediate elements.

In the description of the foregoing embodiments, specific features, structures, materials, or characteristics may be combined in a suitable manner in any one or more embodiments or examples.

The above are merely specific implementations of the present disclosure, but the protective scope of the present disclosure is not limited to this. Variations or replacements which any person skilled in the art can easily think of within the technical scope disclosed in the present disclosure should be covered by the protective scope of this disclosure. Therefore, the protective scope of the present disclosure shall be defined by the protective scope of the claims.

What is claimed is:

1. An array substrate, comprising:
    a base substrate;
    data lines and pixel electrodes arranged on the base substrate; and
    a light shielding structure disposed between the data lines and the base substrate, the light shielding structure comprising a metal layer and a first transparent layer located on a side of the metal layer away from the base substrate,
    wherein the light shielding structure and a gate metal layer of the array substrate are formed in a same layer with a same material, and
    wherein the light shielding structure further comprises:
    a second transparent layer located on a side of the metal layer close to the base substrate.

2. The array substrate according to claim 1, wherein,
    the metal layer is made of copper;
    the first transparent layer and/or the second transparent layer are made of molybdenum oxide.

3. The array substrate according to claim 1, wherein a film thickness of the first transparent layer satisfies a formula as follows:

$$2*n1*h1=(2k-1)*(\lambda 1/2);$$

wherein n1 is a refractive index of the first transparent layer, h1 is the film thickness of the first transparent layer, k is a positive integer, $\lambda 1$ is a wave length of light incident from a side of the first transparent layer away from the base substrate.

4. The array substrate according to claim 3, wherein n1 ranges from 2.2 to 2.3, and the film thickness of the first transparent layer ranges from 50 nm to 60 nm.

5. The array substrate according to claim 2, wherein a film thickness of the second transparent layer satisfies a formula as follows:

$$2*n2*h2=(2k-1)*(\lambda 2/2);$$

wherein n2 is a refractive index of the second transparent layer, h2 is the film thickness of the second transparent layer, k is a positive integer, $\lambda 2$ is a wave length of light incident from a side of the second transparent layer away from the metal layer.

6. The array substrate according to claim 5, wherein n2 ranges from 2.2 to 2.3, and the film thickness of the second transparent layer ranges from 50 nm to 60 nm.

7. The array substrate according to claim 1, wherein there are gaps between orthographic projections of the data lines on the base substrate and orthographic projections of outlines of the pixel electrodes on the base substrate, and orthographic projections of the gaps on the base substrate are located within an orthographic projection of the light shielding structure on the base substrate.

8. A display device, comprising the array substrate according to claim 1 and a color-filter substrate arranged opposite to the array substrate, the array substrate being located on a light outgoing side of the color-filter substrate.

9. A method for manufacturing an array substrate, comprising:
    providing a base substrate;
    forming data lines and pixel electrodes on the base substrate, wherein there are gaps between orthographic projections of the data lines on the base substrate and orthographic projections of outlines of the pixel electrodes on the base substrate; and
    forming a light shielding structure on a side of the date lines close to the base substrate, wherein orthographic projections of the gaps on the base substrate are located within an orthographic projection of the light shielding structure on the base substrate, and the light shielding structure comprises a metal layer and a first transparent layer located on a side of the metal layer away from the base substrate,
    wherein the forming the light shielding structure comprises:
    forming the light shielding structure and a gate metal layer of the array substrate through a single patterning process; and
    wherein the forming the light shielding structure further comprises:
    forming a second transparent layer on a side of the metal layer close to the base substrate.

10. The method for manufacturing an array substrate according to claim 9, comprising:
    forming, on the base substrate, a three-layer structure comprising a molybdenum oxide layer, a copper layer and a molybdenum oxide layer;
    coating a photoresist on the three-layer structure, and exposing and developing the photoresist to form a photoresist pattern; and etching the three-layer structure by an etching solution by using the photoresist pattern as a mask, to form the light shielding structure and the gate metal layer of the array substrate.

11. The method for manufacturing an array substrate according to claim 10, wherein the forming the molybdenum oxide layer on the base substrate comprises:

bombarding a molybdenum oxide target with a plasma to form the molybdenum oxide layer on the base substrate, wherein a gas flow rate of a sputtering gas forming the plasma ranges from 600 to 800 sccm, a deposition pressure ranges from 0.25 to 0.35 pa, a sputtering power ranges from 7.5 to 8.5 kw, and a film formation rate of the molybdenum oxide layer ranges from 1.3 to 1.4 nm/s.

* * * * *